United States Patent [19]

Escher et al.

[11] Patent Number: 5,118,538
[45] Date of Patent: Jun. 2, 1992

[54] ELECTRICALLY CONDUCTIVE POLYMERS AND THEIR USE AS ORIENTING LAYER IN LIQUID-CRYSTAL SWITCHING AND DISPLAY ELEMENTS

[75] Inventors: Claus Escher, Mühltal; Hans-Rolf Dübal, Königstein; Michael Feldhues, Bad Soden am Taunus; Takamasa Harada, Oberursel; Gerhard Illian, Frankfurt am Main; Thomas Mecklenburg, Butzbach, all of Fed. Rep. of Germany; Mikio Murakami, Kakegawa, Japan; Dieter Ohlendorf, Liederbach; Karl Pampus, Kelkheim, both of Fed. Rep. of Germany

[73] Assignee: Hoechst Aktiengesellschaft, Frankfurt am Main, Fed. Rep. of Germany

[21] Appl. No.: 562,600

[22] Filed: Aug. 3, 1990

[30] Foreign Application Priority Data

Mar. 5, 1989 [DE] Fed. Rep. of Germany ....... 3925970

[51] Int. Cl.$^5$ .................................................. C02F 1/13
[52] U.S. Cl. ......................................... 428/1; 359/75; 359/78
[58] Field of Search .................. 428/1; 350/341,339 R

[56] References Cited

U.S. PATENT DOCUMENTS

| | | | |
|---|---|---|---|
| 4,367,924 | 1/1983 | Clark et al. | 350/334 |
| 4,370,028 | 1/1983 | Bernhardt | 350/341 |
| 4,599,194 | 7/1986 | Frommer et al. | 524/401 |

FOREIGN PATENT DOCUMENTS

| | | |
|---|---|---|
| 0257573 | 3/1988 | European Pat. Off. |
| 0292905 | 11/1988 | European Pat. Off. |
| 0313998 | 5/1989 | European Pat. Off. |
| 0353760 | 2/1990 | European Pat. Off. |
| 0374865 | 6/1990 | European Pat. Off. |
| 3628895 | 3/1988 | Fed. Rep. of Germany |
| 3717668 | 12/1988 | Fed. Rep. of Germany |
| 3736114 | 7/1989 | Fed. Rep. of Germany |
| 3843228 | 6/1990 | Fed. Rep. of Germany |

OTHER PUBLICATIONS

Nakaya et al., Japanese Journal of Applied Physics, vol. 28, pp. L116–L118; Jan. 1989.

Primary Examiner—Alexander S. Thomas
Attorney, Agent, or Firm—Curtis, Morris & Safford

[57] ABSTRACT

Switching and display elements based on ferroelectric liquid-crystals often exhibit a pronounced optical hysteresis which results in the appearance of so-called ghost images. This phenomenon can be markedly reduced or even suppressed if at least one of the two orienting layers are in direct contact with the electrodes and is composed of an electrically conductive polymer of the formula (I):

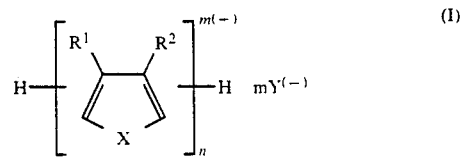

in which
$R^1$, $R^2$ = independently of each other, H, or straight-chain or branched alkyl or alkoxy containing 1-16 carbon atoms, or halogen.
$X = S$, NH,
$Y^- = BF_4^-$, $PF_6^-$, $PO_4^{3-}$, $AsF_6^-$, $SbCl_6^-$, $SO_4^{2-}$, $HSO_4^-$, alkyl—$SO_3^-$, perfluoroalkyl—$SO_3^-$, aryl—$SO_3$, $F^-$ or $Cl^-$, and
n is an integer from 4 to 100 and
m is an integer from 1 to 30.

7 Claims, 2 Drawing Sheets

ELECTRICALLY CONDUCTIVE POLYMERS AND THEIR USE AS ORIENTING LAYER IN LIQUID-CRYSTAL SWITCHING AND DISPLAY ELEMENTS

BACKGROUND OF THE INVENTION

Switching and display elements in which ferroelectric liquid crystals are used as switching and display medium (FLC displays) are described, for example, in U.S. Pat. No. 367,924. They contain a layer of a ferroelectric liquid-crystalline medium (FLC) which is enclosed on both sides by electrically insulating layers, electrodes and boundary plates, normally glass plates. In addition, they contain a polarizer if they are operated in the guest-host mode and two polarizers if they are operated in the birefringence mode. The electrically insulating layers are intended to prevent electrical short circuits between the electrodes and the diffusion of ions from the glass of the boundary plates into the liquid-crystalline layer. Furthermore, at least one and preferably both of the insulating layers act as orienting layers which convert the liquid-crystalline material to a configuration in which the molecules of the liquid-crystalline layer lie with their long axes parallel to one another and in which the smectic planes are arranged perpendicularly or at an angle to the orienting layer. In this arrangement, there are two possible and equivalent orientations for the FLC molecules into which they can be brought by pulse-type application of an electric field. They always remain in the last orientation produced even if the field is switched off or the display is short-circuited. FLC displays are therefore capable of bistable switching. The switching times are in the region of μs and are the shorter, the higher the spontaneous polarization of the liquid-crystalline material used is.

Compared with the liquid-crystal displays hitherto used, which are not as a rule ferroelectric, FLC displays have, in particular, the advantage that the achievable multiplex behavior, i.e. the maximum number of lines capable of selection in the time-sequential technique ("multiplex technique") is very much larger than in the known non-ferroelectric displays.

A disadvantage of FLC displays may, however, arise from the fact that a display which has been in one of the two stable states (stationary image) for a prolonged time can only be switched over with very great difficulty, i.e. with very high amplitude or very long pulse duration of the applied voltage, to the other state, that is to say it exhibits a pronounced optical hysteresis. As a result, in displays an image which has been written in for a prolonged time can be detected in outline in the subsequent image as a so-called "ghost image". This phenomenon of optical hysteresis is the more pronounced, the higher the spontaneous polarization of the FLC material. Since, on the other hand, the switching time of FLC materials is inversely proportional to the spontaneous polarization, an important advantage of FLC displays is nullified again by this hysteresis. The cause of this phenomenon has so far not been definitely clarified; there are indications that ionic impurities in the FLC are responsible for it.

SUMMARY OF THE INVENTION

In the not prepublished DE-A 3,843,228 of earlier priority, it has already been proposed to considerably reduce or suppress the optical hysteresis phenomenon described in FLC displays by bringing at least one of the electrodes into direct electrical contact with the liquid-crystalline medium. Surprisingly, it has now been found that the optical hysteresis can be suppressed particularly effectively in FLC displays by using a liquid-crystal switching and display element which contains a ferroelectric liquid-crystalline medium, two electrodes, at least one polarizer, two transparent carrier plates and at least one orienting layer, at least one of the orienting layers being in direct electrical contact with the associated electrode and said orienting layer containing an electrically conductive polymer.

Preferably, the orienting layers contain an electrically conductive polymer which is composed of repetitive units of the formula (I):

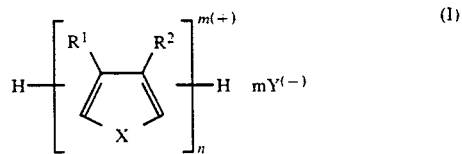

where
R$^1$, R$^2$ are, independently of each other, H, or straight-chain or branched alkyl or alkoxy containing 1-16 carbon atoms, or halogen,
X is sulfur or NH,
Y is BF$_4^-$, PF$_5^-$, PO$_4^{3-}$, AsF$_6^-$, SbCl$_6^-$, SO$_4^{2-}$, HSO$_4^-$, alkyl-SO$_3^-$, perfluoroalkyl-SO$_3^-$, aryl-SO$_3^-$, F$^-$ or Cl$^-$,
n is an integer from 4 to 100 and
m is an integer from 1 to 30.

Electrically conductive polymers, which are soluble in oxidized form in dipolar aprotic solvents at room temperature and which are derived from a monomer of the formula (II)

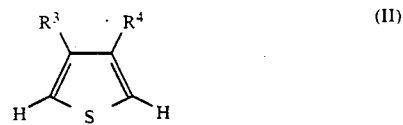

where at least one of the two radicals R$^3$ and R$^4$ is an alkoxy group and the other is optionally (C$_1$-C$_6$)alkyl or hydrogen, have already been described in DE-A 3,717,668, DE-A 3,628,895 and DE-A 3,736,114. The preparation, the stability and electrical conductivity of the various, positively doped polymers were also investigated therein.

For the application in liquid-crystal switching and display elements, electrically conductive polymers of the formula (I) having a (positive) degree of doping of 10% to 30% are particularly suitable, the degree of doping indicating the ratio of electric charge (m) of the polymer to the number of monomer units of which it is made up (n). The undoped polymers have only a negligibly small electrical conductivity, highly doped polymers (polymeric radical cations) are usually unstable or difficult to obtain.

Those conductive polymers in which, in the formula (I), n is an integer from 4 to 30 and m is an integer from 1 to 9, are particularly preferred as constituents of the orienting layer in FLC displays, and an integer from 4 to 10 is very particularly preferred for n and an integer from 1 to 4 for m.

Preferably, conductive polymers are furthermore used in which X in the formula (I) is a sulfur atom and which contain $BF_4^-$, $PO_4^{3-}$, $SO_4^{2-}$, $HSO_4^-$, $F^-$ and/or $Cl^-$ as anion ($Y^-$).

Preferably, the orienting layer contains 30% to 100% by weight of the conductive polymer of the formula (I). Both electrically conductive materials and also nonconducting substances, in particular organic polymers, are suitable as other components.

The orienting layer in the liquid-crystal switching and display element contains, in a further embodiment of the invention, in addition to a polymer of the formula (I) a nonconductive polymer such as, for example, polyvinyl formal, polyvinyl acetal, polyvinyl butyral, polyvinyl acetate, polyvinyl chloride, polyvinyl methyl ether, polyvinyl methyl ketone, polymaleic anhydride, polystyrene, poly-N-vinyl carbazole, poly-N-vinyl pyrrolidone, polyvinyl pyridine, polymethyl acrylate, polymethyl methacrylate, polyacrylnitrile, polyacetaldehyde-, polyacrolein, polyethylene oxide, polytetrahydrofuran, aliphatic polyesters, polycarbonate, polybutyl isocyanate, natural rubber, polyurethane, methylcellulose, ethylcellulose, cellulose triacetate and polymethylsiloxane. The orienting layer may, however, also contain further conductive polymers. In the case of large-area displays, in particular, it may be expedient in order to avoid short circuits for one of the orienting layers to be composed of an electrically conductive polymer while the other is an electrically insulating layer.

The reduction of the optical hysteresis is the more pronounced, the higher the electrical conductivity of the polymers. Their specific conductance should therefore be at least $10^{-5}$ Siemens $m^{-1}$ in the direction perpendicular to their plane and their conductance at least 100 Siemens $m^{-2}$.

BRIEF DESCRIPTION OF THE DRAWINGS

The following detailed description, given by way of example but not intended to limit the invention solely to the specific embodiment described, may best be understood in conjunction with the accompanying drawings, in which.

The invention is also illustrated in more detail by the attached drawing.

Figures 1, 1A, 1B, 2:
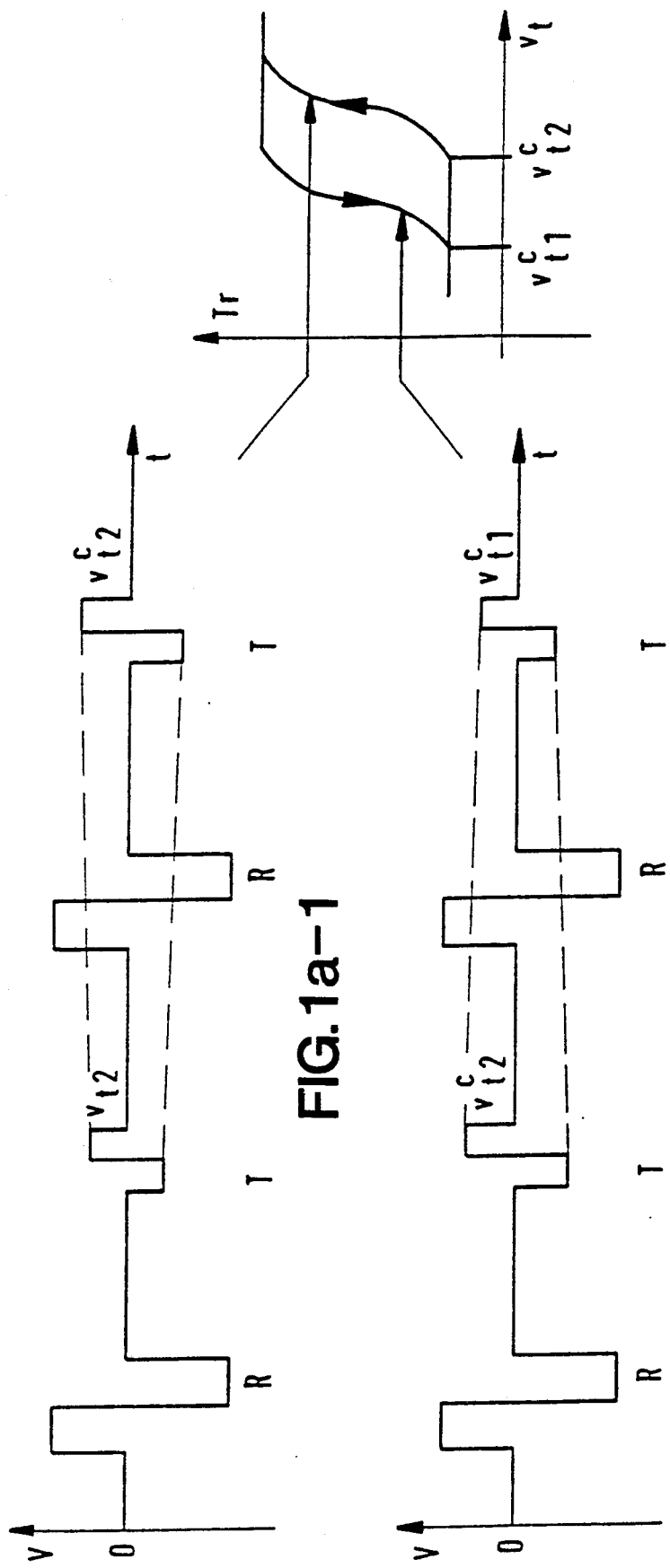
FIG. 1a schematically shows a plot of voltage as a function of time for a liquid-crystal switching and display element according to a preferred embodiment of the present invention.
FIG. 1b schematically shows a plot of optical transmission as a function of voltage for a liquid-crystal switching and display element according to a preferred embodiment of the present invention.

The phenomenon of optical hysteresis is shown in FIG. 1.

An FLC display is subjected to a train of bipolar voltage pulses (FIG. 1a), and in particular, a "reset pulse" R, which is large enough for the display always to switch, is in each case followed by an inverse test pulse T. If the voltage of the test pulse ($V_t^c$) is large enough, the display switches in the opposite direction to that in the case of the reset pulse, which results in a flashing indication by the display. At the same time, the minimum voltage (critical voltage of the test pulse) $V_t^c$ (FIG. 1b) which is necessary for switching by the test pulse is dependent on the previous history of the switching of the display. If the starting situation is such that the test pulses are too small for switching, with the result that the display is static, the increase in the test voltage $V_t$ results in a switching, i.e. flashing display (FIG. 1a, top) only at relatively high values $V_{t2}^c$ (FIG. 1b). If the height of the test pulse (FIG. 1a, bottom) is reduced starting from the $V_{t2}^c$, display continues to switch (flashing display), and only on reducing the height of the test pulse markedly below $V_{t2}^c$, does the test pulse no longer switch the display ($V_{t1}^c$) and the display becomes static again. This "optical hysteresis" is shown in idealized form in FIG. 1b (Tr stands for the optical transmission and $V_t$ is the voltage of the test pulse).

In high information density displays, the phenomenon of optical hysteresis results in individual image points switching or not switching depending on their previous history when the selection voltage, which is in practice equivalent to the test pulse of the experiment, is altered, as a result of which so-called ghost images occur.

Figure 2A:
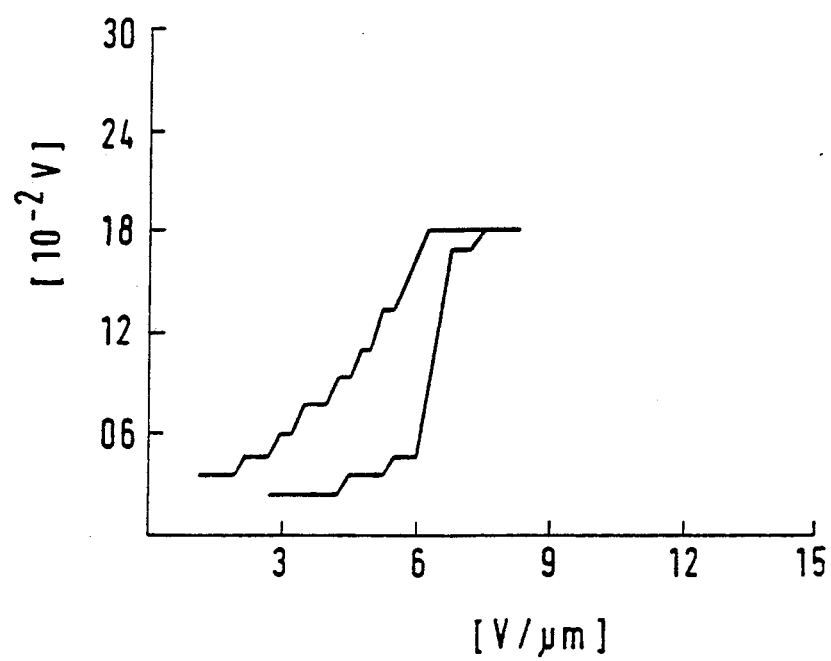
FIG. 2a schematically shows a plot of intensity (in volts) as a function of electrical field strength (in volts/μm) for a conventional liquid-crystal switching and display element.
Figure 2B:
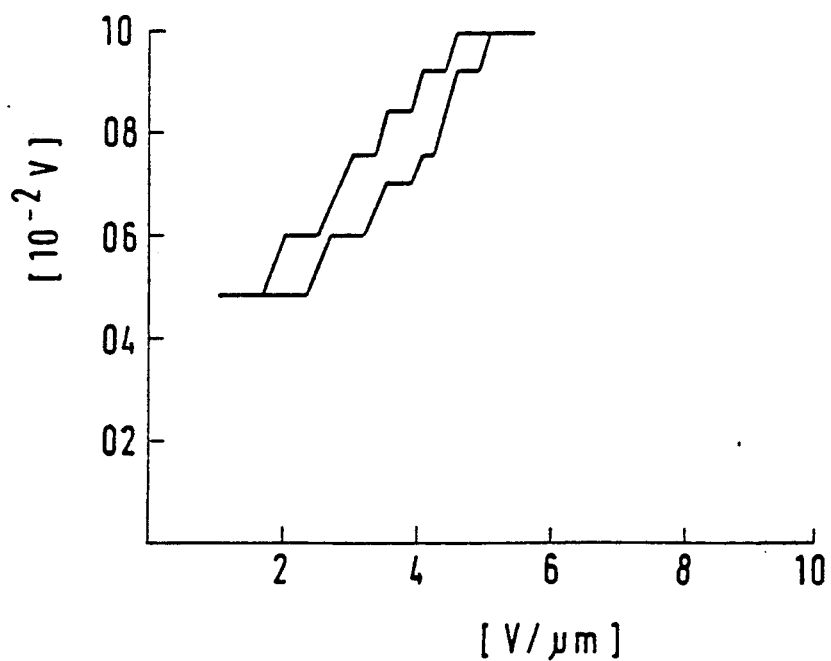
FIG. 2b schematically shows a plot of intensity (in volts) as a function of electrical field strength (in volts/μm) for a liquid-crystal switching and display element according to a preferred embodiment of the present invention.

In FIGS. 2a and 2b, the intensity (in volts) (which is proportional to the transmission) is plotted as the vertical axis and the electrical field strength (in volts/μm) as the horizontal axis.

FIG. 2 shows as a comparison the hysteresis curve, obtained by the method explained above, of a known display in which the electrodes are insulated against the FLC by an orienting layer (FIG. 2a), and of a display according to the invention in which two orienting layers of stroked conductive polymer are in direct contact with the FLC (FIG. 2b). The extensive suppression of the hysteresis is clearly perceptible in the latter case.

DESCRIPTION OF THE PREFERRED EMBODIMENTS

Owing to its good orienting properties (good planar orientation) and its high electrical conductivity, the use of a polymer of the formula (III):

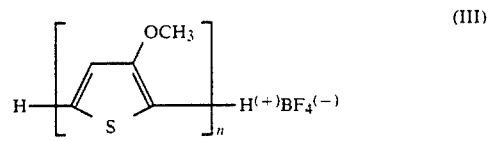

(III)

in which n = 5 or 6, has proved particularly advantageous for orienting layers in displays. The precise procedure during coating and also the electro-optical results are illustrated in Example 1.

To achieve a high optical transparency, it may be advantageous to use a polymer blend instead of a pure polymer. Thus, the mixed system composed of the polymer according to formula (III) and a polymethacrylate of the formula (IV)

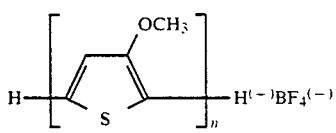

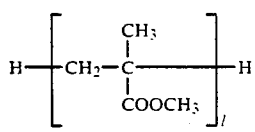

results in a markedly improved optical transparency. The above-mentioned nonconductive polymers are also particularly suitable as further constituents of polymer blends.

The invention is illustrated by the examples below.

EXAMPLE 1

A 2%-strength nitromethane solution of an electrically conductive polymer having the following structural formula:

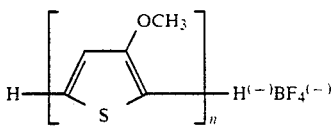

in which n is equal to 5 or 6, is spun for 30 seconds by a spin coating technique at 1500 revolutions/minute on to a 1 mm thick glass substrate previously provided with a transparent electrode. The substrate and the layer obtained from the solution deposited thereon are annealed at 120° C. in a drying oven in order to expel the solvent by distillation. A polymer layer is obtained which has a 100 nm layer thickness and which is then gently stroked twice in the same direction with the aid of a stroking machine in each case. A homogeneous, slightly bluish polymer layer having a thickness of 100 nm and a specific electrical conductance of $8.0 \times 10^{-3}$ S/cm is obtained. Two of the glass substrates thus obtained and coated with the same polymer are in each case placed in parallel and in anti-parallel on top of each other. The substrates are glued with the aid of spacers to form a cell having an electrode spacing of 2.4 μm. The cell is filled with the commercial ferroelectric mixture ®Felix 002 (registered trademark of Hoechst AG). Good bistability is found. The cell shows almost no optical hysteresis, which is confirmed by the results shown in FIG. 2b. The optical transparency of the polymer layer is approximately 50% at a wavelength of 550 nm.

EXAMPLE 2

The following constituents are dissolved in 100 cm³ of γ-butyrolactone by stirring: 1.0 g of the electrically conductive polymer from Example 1 described above and 1.0 g of a polymethyl methacrylate of the formula (IV) which is composed of 50 to 100 monomer units (l=50 to 100). The solution is deposited in the same manner as described in Example 1 on a glass substrate which has previously been provided with a transparent electrode. A layer thickness of 150 nm is obtained after annealing for one hour at 180° C. A liquid-crystal cell having a 2 μm thick liquid-crystal layer is produced by alignment treatment of the substrate in the same manner as in Example 1. The cell is filled with the commercial ferroelectric liquid-crystal mixture ®Felix 002 (manufacturer: Hoechst AG). A good bistability is found. The liquid-crystal switching element exhibits almost no optical hysteresis. The optical transparency of the orienting layer at a light wavelength of 550 nm is measured as 77%.

We claim:

1. A liquid-crystal switching and display element containing a ferroelectric liquid-crystalline medium, two electrodes, at least one polarizer, two transparent carrier plates and at least one orienting layer, wherein at least one of the orienting layers is in direct electrical contact with the associated electrode and said orienting layer contains an electrically conductive polymer of the formula (I):

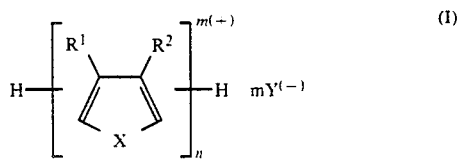

where $R^1$, $R^2$ = independently of each other, H, or straight-chain or branched alkyl or alkoxy containing 1-16 carbon atoms, or halogen, X is sulfur or NH, Y is $BF_4^-$, $PF_5^-$, $PO_4^{3-}$ $AsF_6^-$, $SbCl_6^-$, $SO_4^{2-}$, $HSO_4^-$, alkyl-$SO_3^-$, perfluoroalkyl-$SO_3^-$, aryl-$SO_3^-$, $F^-$ or $Cl^-$, and n is an integer from 4 to 100 m is an integer from 1 to 30.

2. The liquid-crystal switching and display element as claimed in claim 1, wherein n is an integer from 4 to 30, m is an integer from 1 to 9 and $R^1$, $R^2$, X and Y have the meanings specified.

3. The liquid-crystal switching and display element as claimed in claim 2, wherein X is a sulfur atom, Y is equal to $BF_4^-$, $PO_4^{3-}$, $HSO_4^-$, $SO_4^{2-}$, $F^-$ $Cl^-$, and $R^1$, $R^2$, n and m have the meanings specified.

4. The liquid-crystal switching and display element as claimed in claim 1, wherein the orienting layer contains in addition to a polymer of the formula (I) at least one nonconductive polymer.

5. The liquid-crystal switching and display element as claimed in claim 1, wherein the orienting layer contains in addition to a polymer of the formula (I) at least one further conductive polymer.

6. A method for suppressing the optical hysteresis in a liquid-crystal switching and display element, which method comprises contacting an electrode in the liquid-crystal switching and display element with a layer containing an electrically conductive polymer of the formula (I):

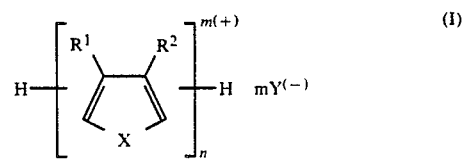

in which

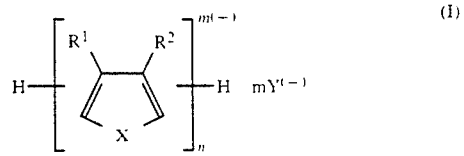

in which
R$^1$, R$^2$ = independently of each other, H, or straight-chain or branched alkyl or alkoxy containing 1-16 carbon atoms, or halogen,
X is sulfur or NH,
Y is BF$_4^-$, PF$_5^-$, PO$_4^{3-}$ AsF$_6^-$, SbCl$_6^-$, SO$_4^{2-}$, HSO$_4^-$, alkyl-SO$_3^-$, perfluoroalkyl-SO$_3^-$, aryl-SO$_3^-$, F$^-$ or Cl$^-$, and
n is an integer from 4 to 100 and
m is an integer from 1 to 30.

R$^1$, R$^2$ = independently of each other, H, or straight-chain or branched alkyl or alkoxy containing 1-16 carbon atoms, or halogen,
X = S, NH,
Y is BF$_4^-$, PF$_6^-$, PO$_4^{3-}$, AsF$_6^-$, SbCl$_6^-$, SO$_4^{2-}$, HSO$_4^-$, alkyl-SO$_3^-$, perfluoroalkyl-SO$_3^-$, aryl-SO$_3^-$, F$^-$ or Cl$^-$, and
n is an integer from 4 to 100 and
m is an integer from 1 to 30.

7. An orienting layer in a liquid-crystal switching and display element, which orienting layer comprises an electrically conductive polymer of the formula (I):

* * * * *